(No Model.)

J. M. THOMPSON.
ORE CONCENTRATOR.

No. 471,258.  Patented Mar. 22, 1892.

Witnesses
P. E. Monteverde
Jos. H. Hoadley.

Inventor.
James Monroe Thompson

UNITED STATES PATENT OFFICE.

JAMES MONROE THOMPSON, OF SAN FRANCISCO, CALIFORNIA.

ORE-CONCENTRATOR.

SPECIFICATION forming part of Letters Patent No. 471,258, dated March 22, 1892.

Application filed May 29, 1885. Serial No. 167,101. (No model.)

*To all whom it may concern:*

Be it known that I, JAMES MONROE THOMPSON, a citizen of the United States, residing in the city and county of San Francisco, and State of California, have invented an Improved Ore-Concentrator; and I do hereby declare that the following is a full, clear, and exact description of my invention, which will enable others skilled in the art to which it appertains to make and use the same.

My invention relates to that class of machines employed for separating or concentrating substances of different specific gravities, and more especially the metals or sulphurets contained in ores, or that portion which has escaped the process to which the ores are usually subjected before passing into a concentrator, and to which a vibrating or oscillating motion is given.

In order to fully describe my invention, reference is made to the accompanying drawings, in which like letters indicate like parts in the different views.

Figure 1:
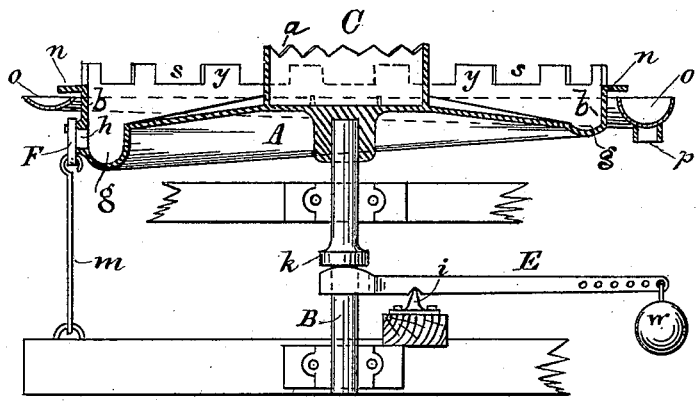
Figure 2:
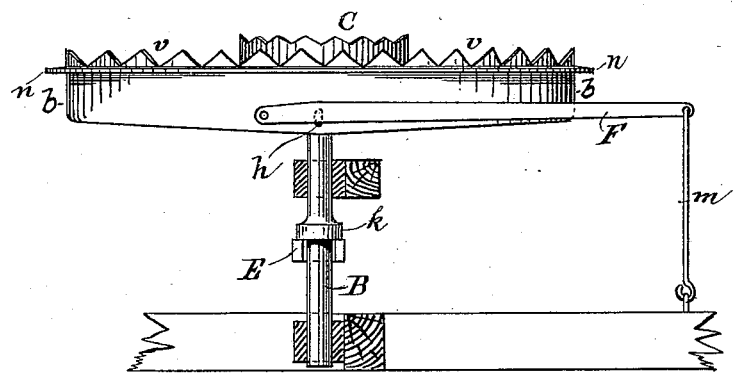
Figure 3:
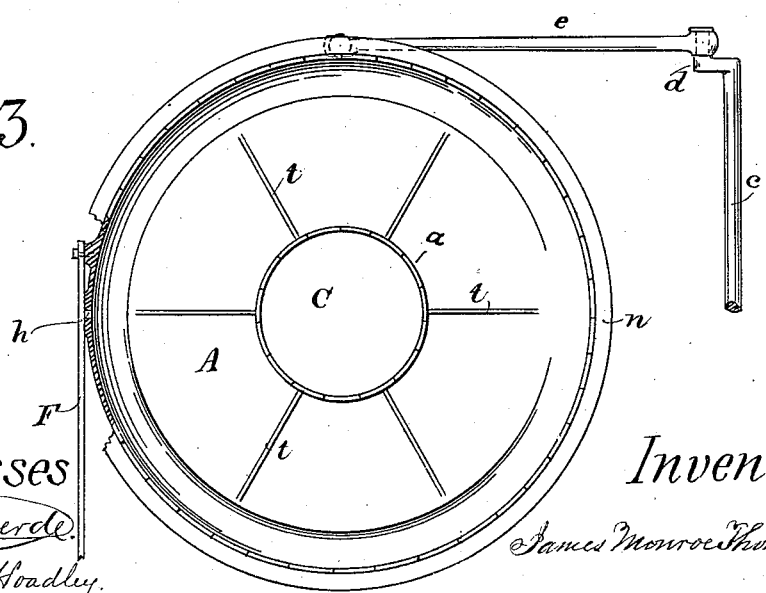

Figure 1 is a sectional view of my improved concentrator. Fig. 2 is a side view showing my automatic gate for regulating the discharge of the sulphurets, and Fig. 3 is a plan view of my concentrator.

A is the concentrating pan or table, which is secured to the vertical shaft B, by which it is supported and on which it is vibrated by the driving-shaft $c$ by means of the crank $d$ and pitman $e$. If preferred, the shaft B can be extended through the pan and a box or bearing provided for its upper end to better secure the pan in its horizontal position.

C is a circular bowl for receiving and distributing the "pulp" or material to be treated, which can be secured to the bottom of the pan or table A or formed on it by the central circular upright flange $a$, as shown. The pan A has a low side or rim, which is formed by the narrow upright flange $b$ at its periphery, and its bottom is made convex in form; or the bottom of the pan is depressed or inclined downward from its center to its periphery, and the groove or trough $g$ is formed in the bottom of the pan at its periphery and deepens toward the discharge-outlet $h$ in the side of the pan.

The entire pan and contents, with its shaft, are supported on one end of the pivoted beam or lever E, which rests on or is pivoted to the fulcrum $i$, and has the movable weight $w$ resting on its outer end, so that when the concentrator is in operation the weight $w$ can be moved to a position on the lever at which it will exactly balance the pan and its entire contents. A collar $k$ is secured to the pan-shaft B, and the end of the lever E is bifurcated and passed under the collar, so that the pan and its shaft rest on the end of the lever.

F is another lever or arm which is pivoted to the side of the pan and serves the purpose of a gate for regulating the discharge through the opening $h$ of the sulphurets or heavier particles which accumulate in the trough or groove $g$. To the outer end of this gate or lever F is pivoted the upper end of the arm or rod $m$, which has its lower end pivoted to the frame on which the whole is mounted.

The top of the rim or side of the pan is turned outward, so as to form the lip or projection $n$, over which the lighter portion of the contents flows into the trough $o$, which deepens toward one or more outlets $p$. This trough $o$ can be formed on or attached to the outside of the pan, in which case the top or side of the pan need not be turned outward; or it can be detached and stationary, as shown, which construction I prefer, as it lessens the weight of the contents of the pan.

The pan A is so formed, adjusted, and operated as to receive the pulp or current in its center, and to cause the same to flow or move from thence to all points of its periphery, and be discharged therefrom. Hence it is desirable that the top of the periphery or side of the pan be so formed as to concentrate or lessen the width of the current or discharge sufficiently to give it depth enough to more freely carry or float with it the lighter particles over the side of the pan, and at the same time preserve a uniform and no greater depth than is necessary to effect the discharge of the lighter particles, so that their discharge will be confined as near as possible to the surface of the current. To effect this, the pan rim or periphery has the upright rectangular extensions or projections $y$ $y$, Fig. 1, formed on its top at equal distances apart and entirely around it, which obstruct the flow of the current and direct or cause it to flow through the spaces $s$ $s$ between them.

These upright projections y y must be of equal length as well as distances apart, and the pan must be kept in an exactly level position, in order to insure an equal flow or discharge of the "débris" or lighter particles all around the periphery of the pan.

Ribs or riffles t t are formed on or attached to the bottom of the pan in radial lines from its center, as shown in Fig. 1, for the purpose of aiding in the agitation of the contents near the center of the pan, where the vibration is less than near the periphery.

The operation of my improved concentrator, which, besides treating and concentrating substances suspended in and carried by water, can also in many cases be made useful for concentrating dry material, is as follows: The pulp or material is continuously passed into the pan A from the distributer C and is caused by the constant vibration of the pan and the inclination of its bottom to slowly move or radiate from its center to its periphery, and in the meantime the particles are agitated by the motion and kept in a "loose" and moving condition, so that the heavier particles fall to the bottom and force the lighter ones to the top, which latter pass out of the pan over its sides and between the upright projections y y and escape into the trough o, while the former pass into the trough or groove g and are gradually progressed toward their discharge-opening h, and when the proper quantity of these heavier particles accumulate in the pan the increase in the weight of the contents of the pan caused thereby will cause the pan which is balanced on the lever E by the weight w to be depressed and carry with it the end of the lever or gate F, which is pivoted to it, while the other or outer end of the lever will be kept at the same height by the rod m, so that the gate will be caused to move relatively upward on the side of the pan at the point where it covers the opening h, and open it more or less in proportion to the depression of the pan and permit the discharge of a portion of the sulphurets, and when by their discharge the weight of the contents of the pan is decreased it is raised by the weight w, and a reverse motion of the gate F is produced, which causes it to close the opening h more or less, according to the elevation of the pan, and in this manner the amount of the sulphurets in the pan is kept within certain limits, thereby insuring their regular and proper discharge and a more uniform action of the concentrator than can otherwise be obtained.

Having thus described my invention, what I claim as new is—

1. The circular concentrating vibrating pan or table A, constructed with the low side or narrow upright flange b on its periphery, the circular trough g in its bottom at its periphery, the opening h through its side at or near its bottom, and the central circular upright flange a on its bottom, in combination with the vertical central supporting-shaft B, pitman e, crank d, and shaft c, substantially as and for the purpose described.

2. The circular concentrating vibrating pan or table A, constructed with the trough g in its bottom at its periphery, the opening h through its side at or near its bottom and having the gate F pivoted to its outside, in combination with the bifurcated lever E, fulcrum i, weight w, upright pivoted arm or rod m, and the vertical central supporting-shaft B, which has secured to it the collar k, substantially as and for the purpose described.

3. The vibrating circular concentrating-pan A, having in its center the receiver and distributer C, in its side or periphery the discharge-opening h, and on its bottom the radial ribs or riffles t t, substantially as and for the purposes described.

In witness whereof I hereunto set my hand this 16th day of April, 1885.

JAMES MONROE THOMPSON.

Witnesses:
  Jos. H. Hoadley,
  T. E. Monteverde.